US008690148B1

(12) United States Patent
Smith et al.

(10) Patent No.: US 8,690,148 B1
(45) Date of Patent: Apr. 8, 2014

(54) UTILIZATION OF AN AIR AMPLIFIER TO REMOVE SHEETS OF PAPER FROM GLASS IN AN AUTOMATED GLASS HANDLER

(75) Inventors: Colin F. Smith, Half Moon Bay, CA (US); Bruce Krein, Campbell, CA (US); Michael Lofstrom, Piedmont, CA (US)

(73) Assignee: Hanergy Holding Group Ltd., Beijing (CN)

( * ) Notice: Subject to any disclaimer, the term of this patent is extended or adjusted under 35 U.S.C. 154(b) by 422 days.

(21) Appl. No.: 13/019,671

(22) Filed: Feb. 2, 2011

(51) Int. Cl.
*B65H 3/30* (2006.01)

(52) U.S. Cl.
USPC ................................ 271/20; 271/98; 271/107

(58) Field of Classification Search
USPC ............................ 271/97, 98, 20, 107, 90, 42
See application file for complete search history.

(56) References Cited

U.S. PATENT DOCUMENTS 3,993,301 A * 11/1976 Vits ................................ 271/98
5,632,595 A * 5/1997 Mori et al. ................ 414/795.6

* cited by examiner

*Primary Examiner* — Michael McCullough
(74) *Attorney, Agent, or Firm* — The Marbury Law Group PLLC

(57) ABSTRACT

A method for removing a sheet of paper from a substrate includes providing an air exhaust stream from an outlet of an air amplifier to the sheet of paper on the substrate to perturb the sheet of paper and lifting the perturbed sheet of paper from the substrate using a sub-atmospheric intake of the air amplifier.

11 Claims, 8 Drawing Sheets

300
302
102
200

500
402
302
502
200
400

UTILIZATION OF AN AIR AMPLIFIER TO REMOVE SHEETS OF PAPER FROM GLASS IN AN AUTOMATED GLASS HANDLER

FIELD OF THE INVENTION

The present invention relates generally to air amplifiers and more particularly to devices employing air amplifiers to remove paper from glass.

BACKGROUND

When stacking sheets of glass for transport, manufacturers often insert paper between the glass sheets. The paper inserts help prevent surface damage that could occur during shipping. When the glass reaches its destination, the paper may be removed. However, under the weight of the stack of glass plate, the paper can form a seal to the glass. This seal makes paper removal from the glass more difficult.

Previous methods of removing the paper inserts from glass sheets have included suction cups and vortex devices. Neither of these means reliably remove the paper every time. Suction cups have difficulty due to the porosity of the paper. The amount of vacuum required to adhere to the paper and break the paper's seal to the glass may also be sufficient for the suction cup to adhere to the glass through the paper. In tests, suction cup reliability for paper pickup was less than 60%. Vortex devices performed better, but vortex reliability was still less than 90%.

SUMMARY

An embodiment of the invention provides a method for removing a sheet of paper from a substrate includes providing an air exhaust stream from an outlet of an air amplifier to the sheet of paper on the substrate to perturb the sheet of paper, and lifting the perturbed sheet of paper from the substrate using a sub-atmospheric intake of the air amplifier.

Further embodiments include a movable end effector device, comprising an air amplifier assembly which comprises an air amplifier comprising a first higher pressure, lower volume intake, a second lower pressure, higher volume sub-atmospheric intake, and an outlet, and an air exhaust directional component configured to direct an air exhaust stream from the outlet

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 1 is an orthographic multiview of an air amplifier in which

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The embodiments of the present invention disclose systems and methods for paper sheet removal from a substrate with reliability exceeding 99%. Embodiments may include a movable end effector (i.e., device for removing paper from a substrate) containing an air amplifier with first and second air intakes and an air outlet. The air amplifier's outlet may be redirected, such as by plate, nozzle or ducting, to blow against the paper. The air blowing on the paper may cause the paper to be perturbed (e.g., ruffle, move and/or float) due to the direct force of the air and/or to air flowing through the semi-porous paper and impinging on the nonporous substrate, such as a glass plate. One of the air amplifier's intakes may be a vacuum. This vacuum may be used to draw the perturbed paper to the air amplifier and away from the glass plate. Contact with the paper is not necessary to draw in the paper away from the glass plate.

Figure 1C:
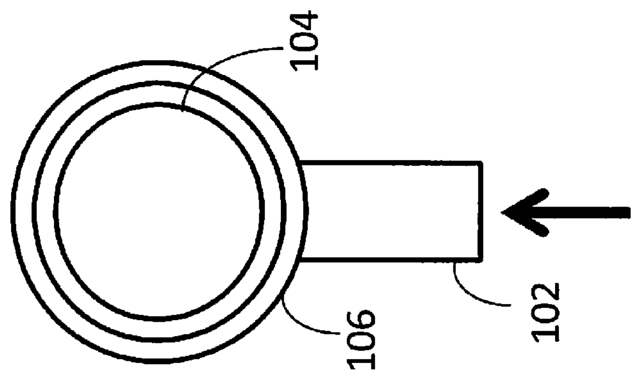
FIGS. 1A and 1B show adjacent side views and FIG. 1C shows a top view.
Figure 1A:
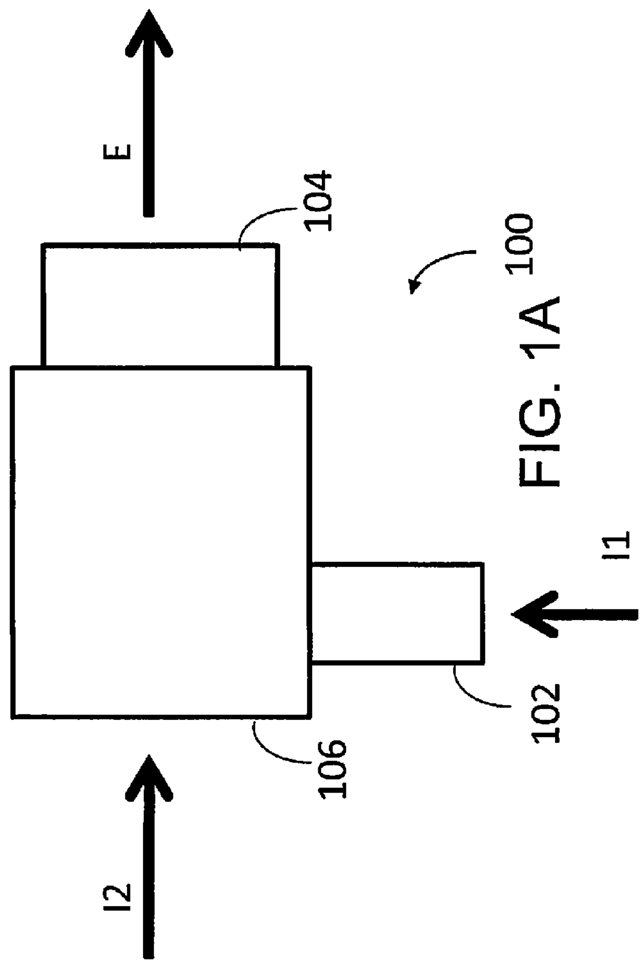
Figure 1B:
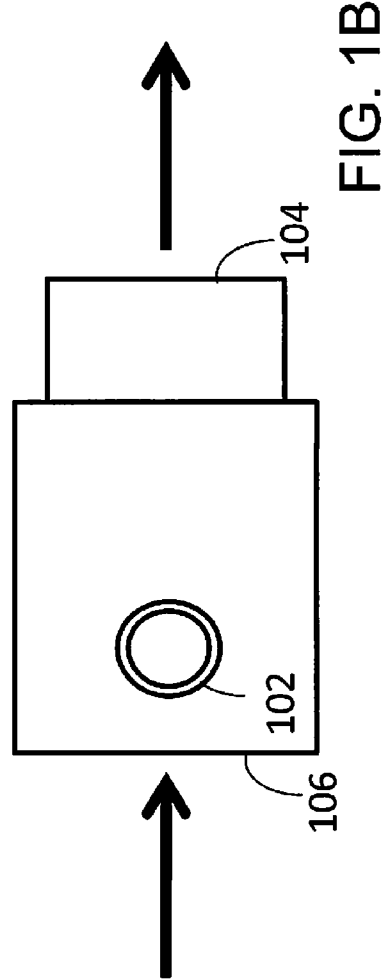

FIG. 1 illustrates three views of a typical air amplifier 100 that may be used in certain embodiments. Air amplifiers may rely on a high pressure, low volume flow, such as that produced by an air compressor, and the aerodynamic properties of its structure to generate a high volume, high velocity air exhaust, and a high volume, low pressure (i.e., mild vacuum below 1 atm pressure) intake. For example, high pressure air may flow into first air intake 102. A high volume, high velocity air exhaust may flow out of air outlet 104. Ambient air may be drawn into second air intake 106 due to a low pressure (e.g., less than 1 atm) generated at the intake 106. These air flows are illustrated as arrows I1 (inlet flow into intake 102), E (exhaust flow from outlet 104) and I3 (inlet flow into intake 106) in FIG. 1. In preferred embodiments, both intakes and the outlet have a circular cross section. Other shapes may also be used. The air passage within the air amplifier may also have a circular cross section that varies in area along the longitudinal axis.

Figure 2:
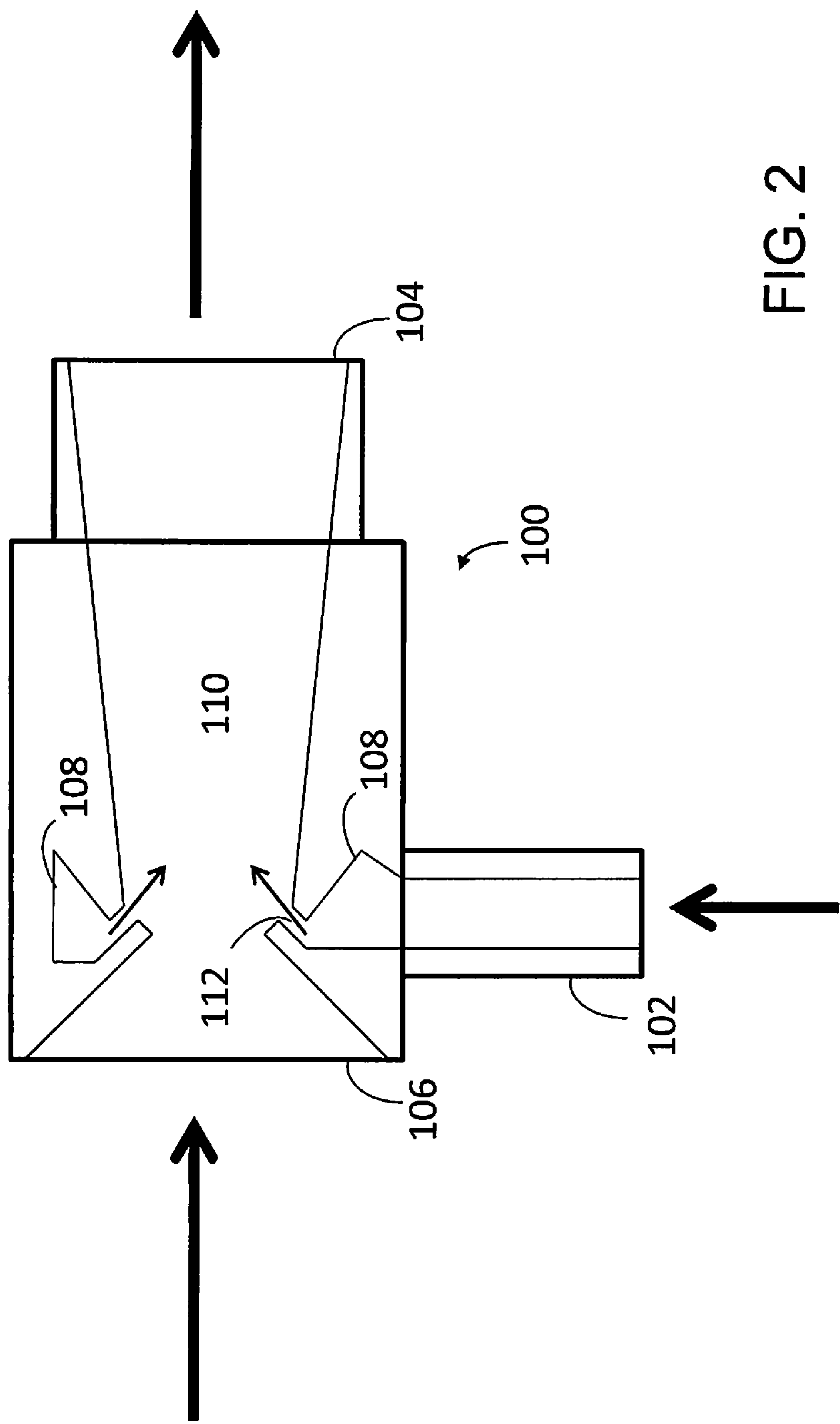
FIG. 2 is a side cross sectional diagram of an air amplifier that relies on the impulse principle.

Although some embodiments may include a moving adjustable nozzle, moving parts are not necessary for an air amplifier. Instead, air amplifiers may rely on fluid dynamics to create the air exhaust flow. Certain embodiments may rely on the impulse principle. FIG. 2 illustrates a cross section of an air amplifier that relies on this principle. High pressure air may flow into the air amplifier 100 through first air intake 102 and into an internal ring chamber 108 encircling the air amplifier's main chamber 110. The high pressure air may enter the main chamber 110 through a small annular nozzle 112. Annular nozzle 112 may be shaped to accelerate and direct the high pressure flow towards the air outlet 104. Under the impulse principle, a relatively small flow of high pressure air may impact and entrain a large mass of air. The high pressure flow from the annular nozzle 112 may create an area of lower pressure in the center (e.g., middle of chamber 110) which may induce a large volume of ambient air to flow into second intake 106 (e.g., the vacuum/sub-atmospheric pressure generated at intake 106). The air from first intake 102 and second intake 106 may combine to create a high volume and high velocity flow out of outlet 104. Chamber 110 may be shaped as a converging, diverging, or a combination of converging and diverging nozzles to accelerate air flow.

Figure 3:
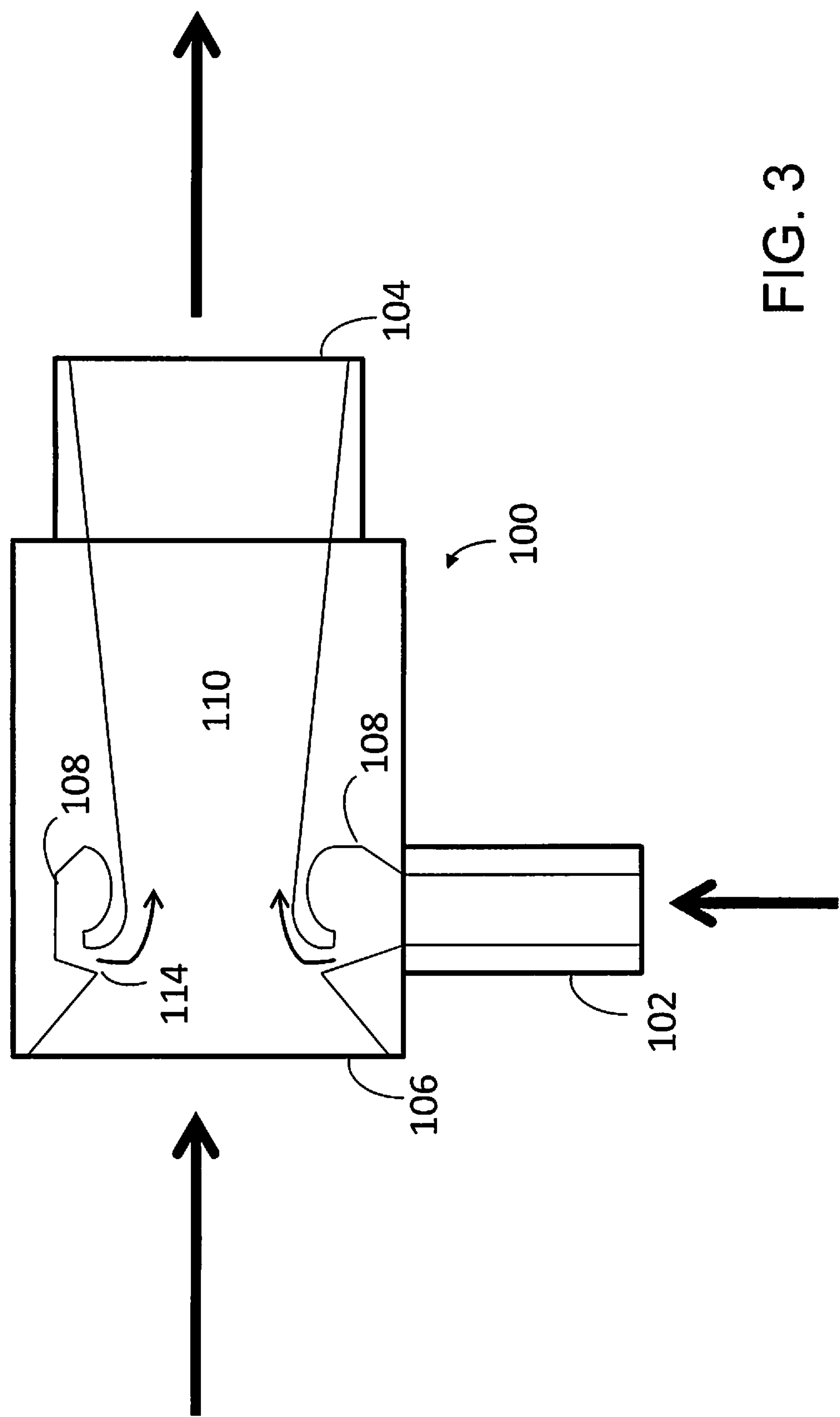
FIG. 3 is a side cross sectional diagram of an air amplifier that relies on the Coanda effect.

Alternate embodiments may rely on the Coanda effect. With the Coanda effect, a high velocity flow will attach to a surface and follow the surface's shape. Air amplifiers take advantage of this by curving the surface of the nozzle leading to inside the main chamber. FIG. 3 illustrates a cross section of an air amplifier that relies on this principle. Similar to the impulse amplifier, high pressure air may flow through first intake 102 and enter ring chamber 108. The high pressure air may flow through an annular nozzle 114 into the main chamber 110. The nozzle 114 may be shaped to accelerate the air. The nozzle 114 may also be curved so that the entering flow will follow the curved surface. This curved surface guides the flow into and through main chamber 110. Just as with the impulse amplifier, the high pressure flow may create an area of lower pressure in the center (e.g., in chamber 110) which induces a large volume of ambient air to flow into second intake 106. The air from first intake 102 and second intake 106 may combine to create a high volume and high velocity flow out of outlet 104. Chamber 110 may be shaped to accelerate this flow.

Figure 4:
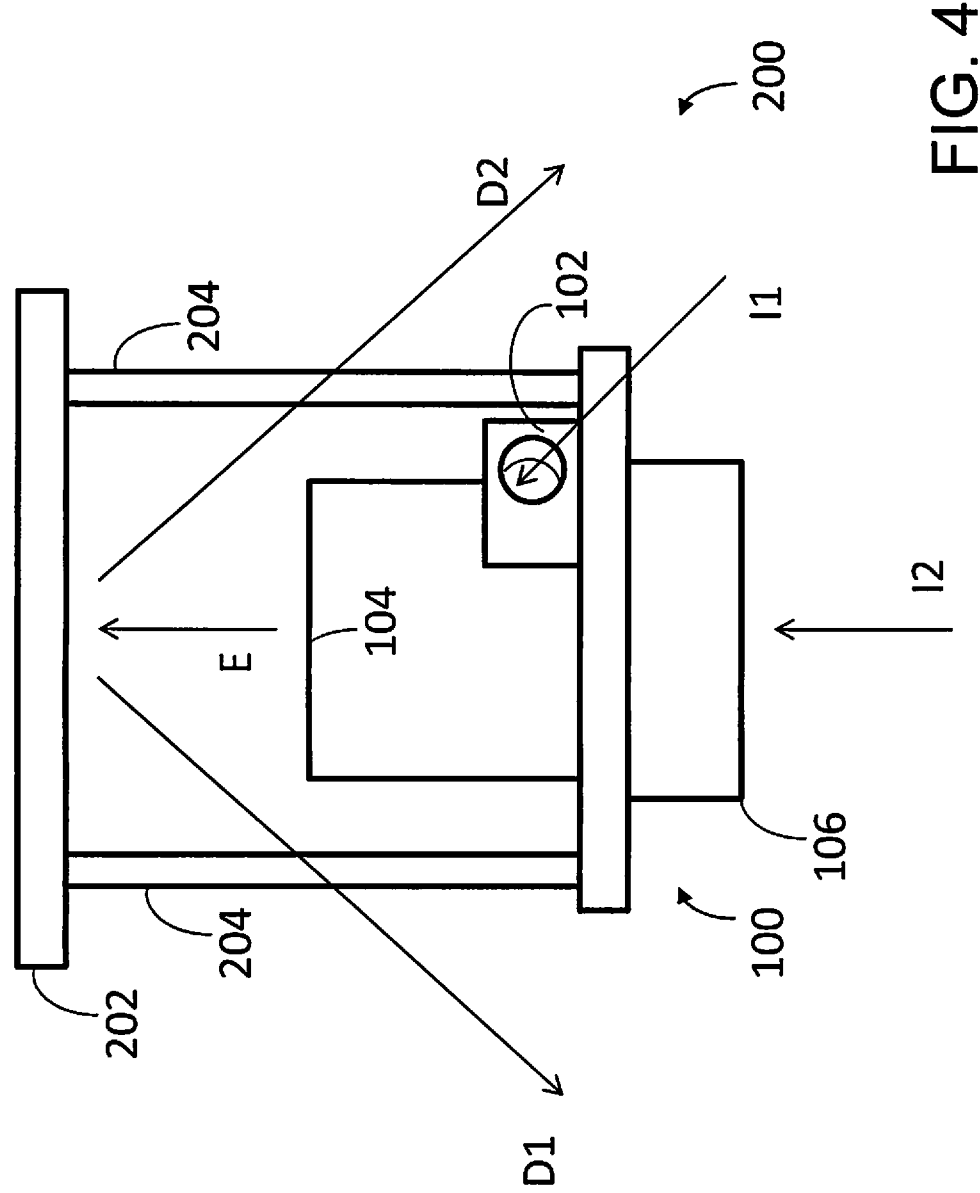
FIG. 4 is a side view diagram of an air amplifier assembly.

Embodiments may include various types of air amplifiers, including impulse, Coanda, or other types of amplifiers. Embodiments may couple an air amplifier with a deflecting mechanism. For example, FIG. 4 illustrates an air amplifier assembly 200. Assembly 200 may include an air amplifier 100 with two intakes 102 and 106 and an outlet 104. Assembly 200 may also include an impinging plate 202 connected to the air amplifier 100 by one or more supports 204, such as pillar(s) or plate(s). Impinging plate 202 may be aligned in front of outlet 104 such that the major surface of the plate 202 is positioned at an angle of 70-110 degrees, such as 90 degrees, with respect to the air exhaust flow direction (arrow E). Thus, when the air amplifier 100 is taking in and exhausting air, the air flowing out from outlet 104 may impinge on impinging plate 202. As illustrated by the arrows in FIG. 4, air may flow into the air amplifier 100 through intakes 102 and 106. Exhaust may flow out of the air amplifier 100 through outlet 104 and impinge on impinging plate 202. This air may then be deflected by impinging plate 202 to flow in one or more different directions shown by arrows D1, D2, such as downward in front and behind amplifier 100.

Embodiments may include various other mechanisms for deflecting the exhaust from outlet 104. Impinging plate 202 may be aligned at various angles or contoured to include multiple deflecting surfaces. There may be more than one impinging plate. The assembly may include another air exhaust directional component instead of the plate 202, such as a nozzle or ducting to deflect the air exhaust stream downward.

Figure 5:
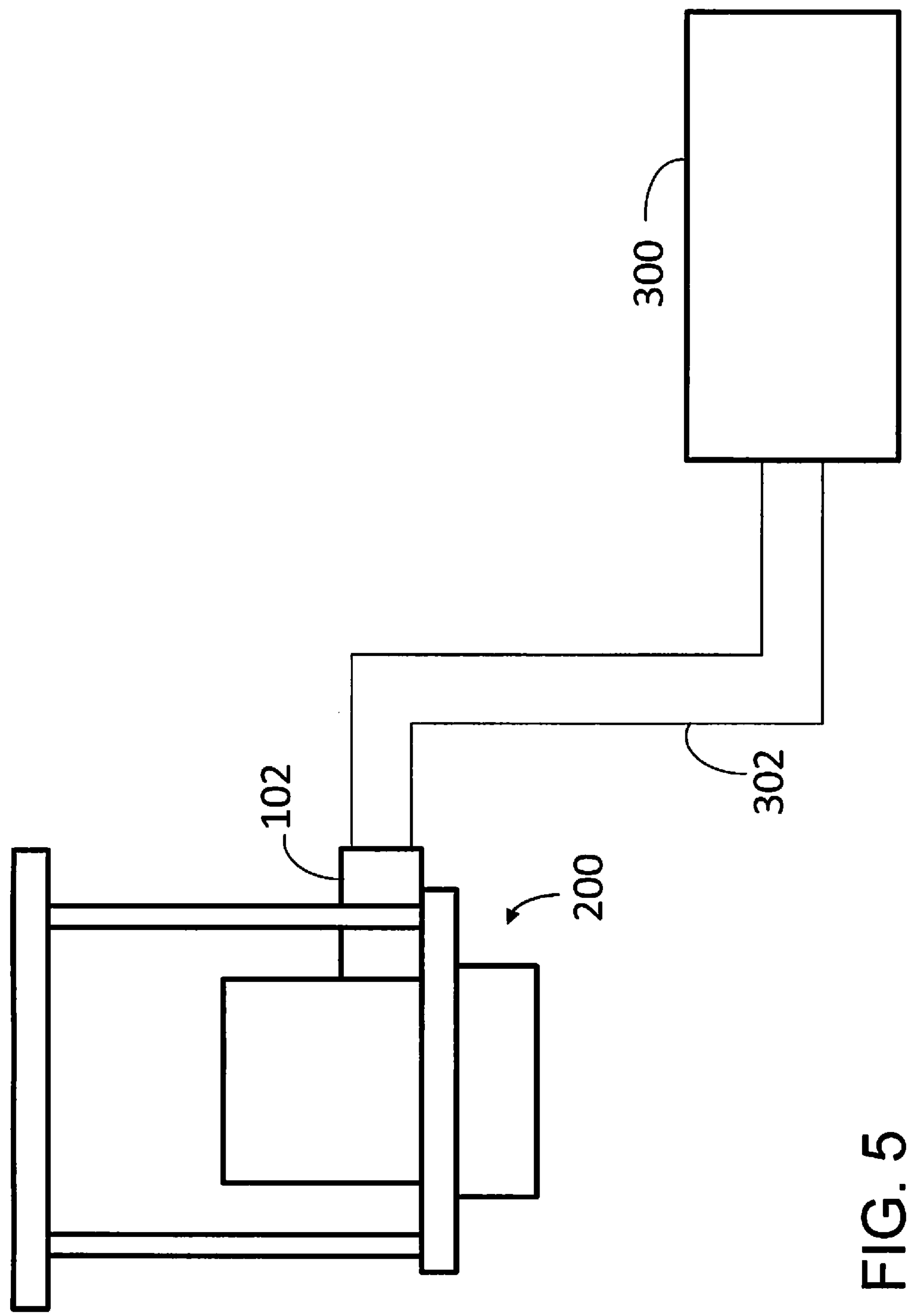
FIG. 5 is a side view diagram of an air amplifier assembly attached to a source of high pressure air.

FIG. 5 illustrates first intake 102 of assembly 200 connected with a source of a high pressure air flow 300 (e.g., air having a pressure above 1 atm.). The source 300 may be located remotely and connected to assembly 200 by air duct 302. Air duct 302 may be any form or structure capable of transporting the high pressure air flow (e.g., a flexible hose or conduit). The source of the high pressure air flow 300 may be a compressor, air blower, a tank of high pressure air, or any other source of high pressure air. Source 300 or duct 302 preferably includes a control mechanism, such as a valve, to control the flow of high pressure air and thereby control the flow of air in assembly 200. Throttling (e.g., reducing) the flow of high pressure air will also throttle (e.g., reduce) air flow in the air amplifier (i.e., air into intake 106 and exhausted from outlet 104) which relies on the high pressure flow to induce air flow. Cutting off the high pressure flow completely will stop the air flow into intake 106 and exhaust through outlet 104.

Figure 6:
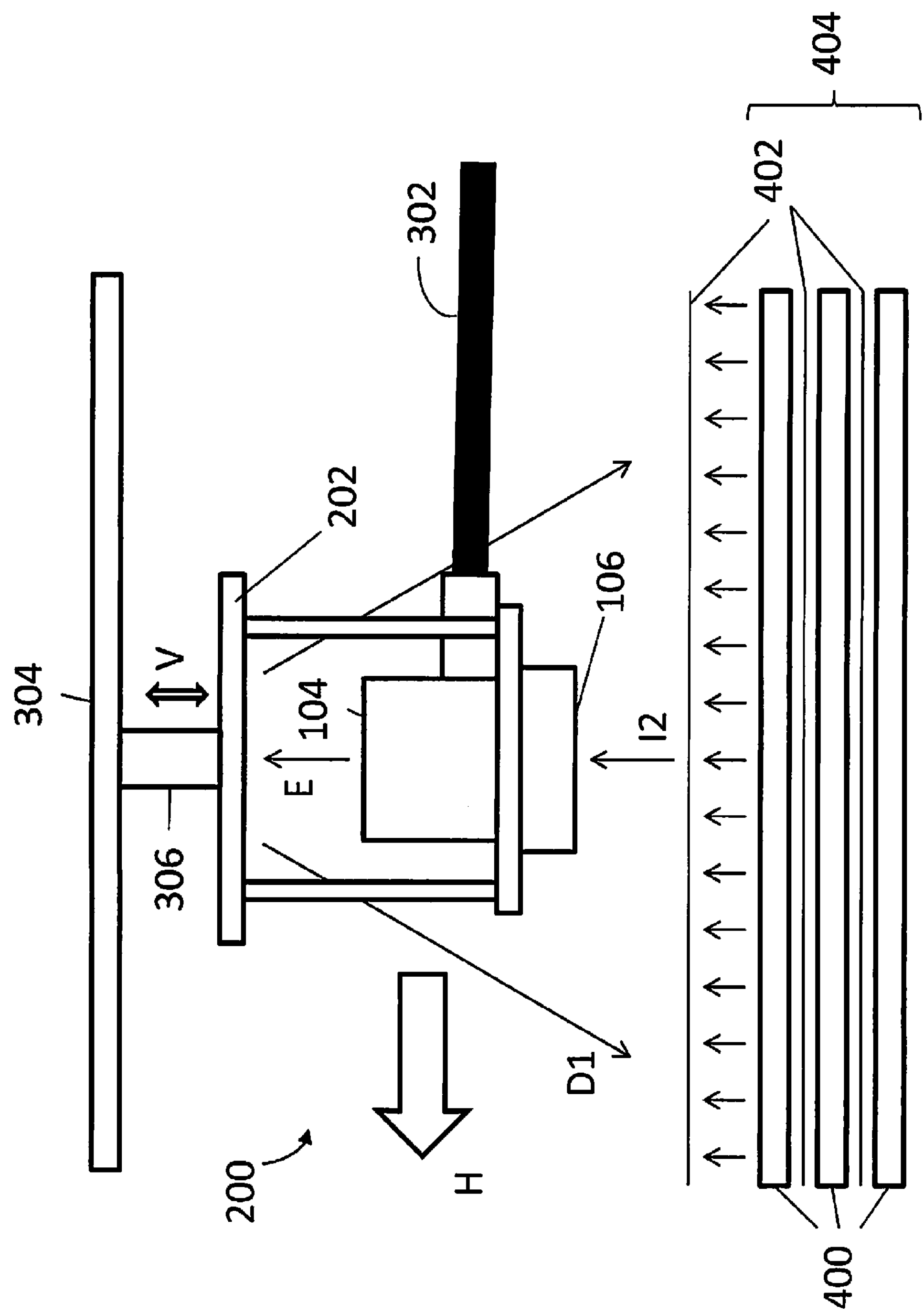
FIG. 6 is a side view diagram of an air amplifier assembly in use to remove paper from a sheet of glass.

FIG. 6 illustrates assembly 200 in an embodiment for removing paper from glass. Assembly intake 102 may be connected to air duct 302. Duct 302 may provide high pressure air to assembly 200. The assembly 200 is supported by any suitable support, such as one or more rails 304. FIG. 6 shows the assembly 200 suspended from at least one rail 304 such that the assembly is movable in at least a horizontal direction shown by arrow H.

The assembly 200 may be connected to the rail(s) 304 using one or more connecting members 306, such as rods, etc. The connecting member(s) 306 may contain a motor and wheels or rollers to allow the assembly 200 and member(s) 306 to be moved along the rail(s) 304. For example, the assembly 200 may be suspended above a substrate, such as a stack 404 of glass plates 400 and intervening sheets of paper 402 between adjacent plates 400, such that the outlet 104 of the air amplifier in assembly 200 faces away from the paper 402 and the vacuum intake 106 faces the paper 402. The rails(s) 304 may be attached to a ceiling of a building housing the stack 404, or the rail(s) 304 may be supported by support walls or columns which straddle the stack 404. For a stack 404 provided on a horizontal floor of a building, the assembly moves in a horizontal direction (shown by arrow H) along the stack 404. If desired, the connecting member(s) 306 may also move the assembly in a vertical direction (i.e., up or down shown by arrow V).

Air may be exhausted from the outlet 104 and deflected by plate 202 in direction(s) D1 that is 0 to 45 degrees from the horizontal direction, H, to impinge on the paper 402. This air flow may perturb (i.e., ruffle, move and/or float) the paper and separate a seal between the paper 402 and underlying glass plate 400. The air flow may pass through the paper 402, which may be porous, and impinge on the glass plate 400 beneath the paper. This air may be deflected back and push up on the paper 402 causing the paper to float.

After the air exhausted and deflected by assembly 200 perturbs the paper on the glass plate, the vacuum (i.e., sub-atmospheric pressure) created in the air amplifier of the assembly may draw air into the second intake 106. Thus, the air exhaust stream (arrows E-D1) from the moving amplifier 100 outlet 104 perturbs the sheet of paper 204 and then the trailing vacuum/sub-atmospheric intake 106 of the amplifier lifts the sheet of paper 402 from the glass plate 400 and the assembly moves the paper 402 away from the stack 404.

As the air amplifier moves in a horizontal direction over the sheet of paper 402 on the substrate (e.g., glass plate 400), the air exhaust stream D1 from outlet 104 perturbs a first portion of the sheet of paper before the sub-atmospheric intake 106 of the air amplifier passes over the same first portion of the sheet of paper and lifts up the first portion of the sheet of paper. The vacuum may be stopped when the assembly 200 is away from the stack 404 to release the paper 402 away from the stack 404. The assembly 200 thus serves as an end effector. The angle of the assembly 200 to the glass 400 and paper 402 may vary, but the second intake 106 should remain facing the paper 402. After removing the paper 402, a robot arm or another handling device (not shown) may then lift the exposed glass plate 400 from the stack 404 and provide it to another location, such as a shipping area or a device assembly area.

Figure 7:
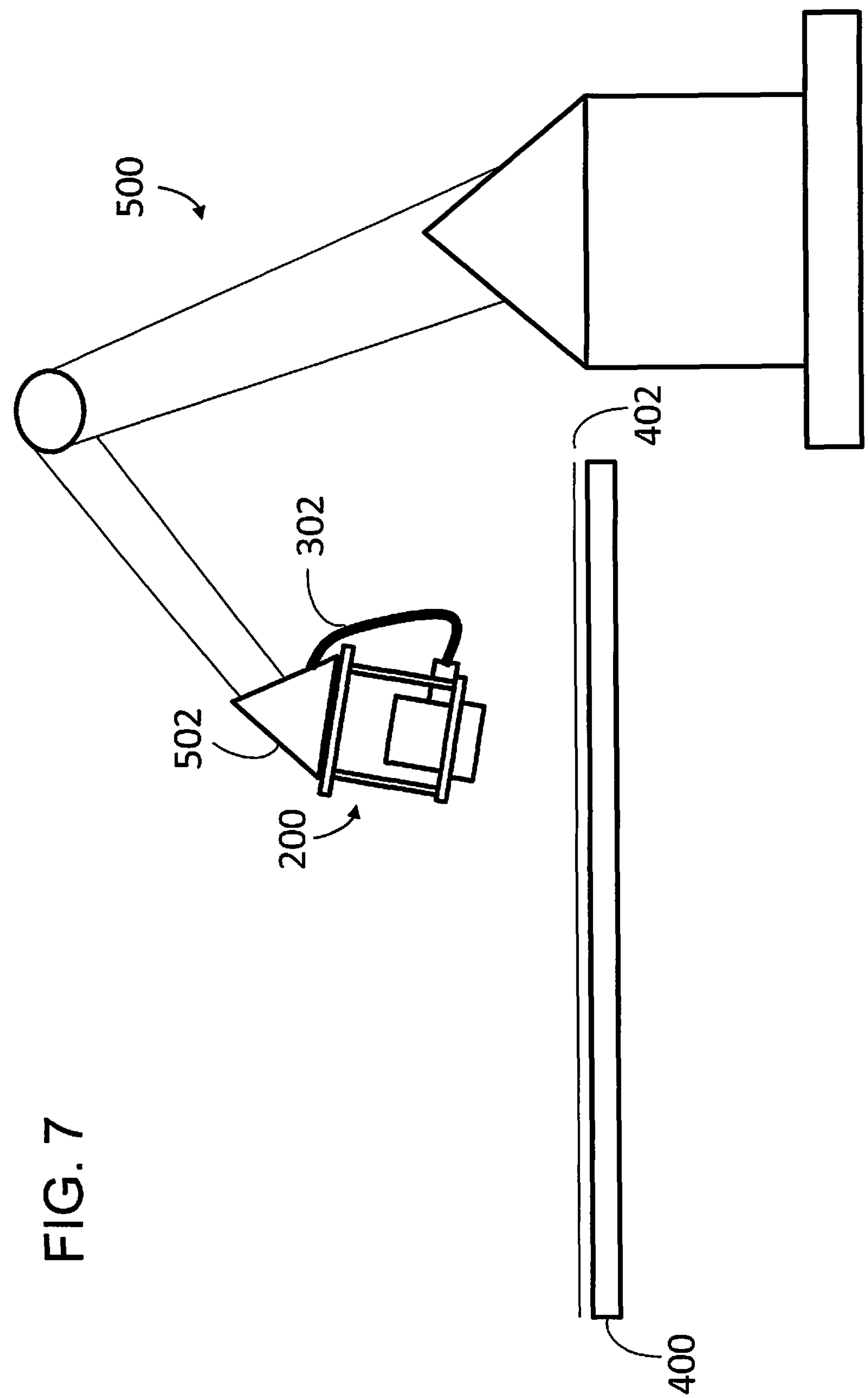
FIG. 7 is a side view diagram of an air amplifier assembly serving as an end effector of a robot arm.

FIG. 7 illustrates an alternative support for the assembly 200. In this embodiment, a robot arm 500 rather than a rail supports the assembly 200. Robot arm 500 may include an arm with joints. Assembly 200 may be mounted to the end 502 of the robot arm. End 502 may be connected to various parts of the assembly 200 including the impingement plate. Duct 302 for supplying high pressure air to the assembly may be run through the robot arm. Robot arm 500 may move the assembly 200 along the stack in the horizontal direction, and optionally in the vertical direction, for removing the paper 402 from the glass plate 400. The robot arm 500 and air flow may be controlled automatically or by an operator. A separate robot arm may be used for moving the glass 400 and paper 402 into the stack 404 and moving the glass plate from the stack 404 once the paper has been removed.

Figure 8:
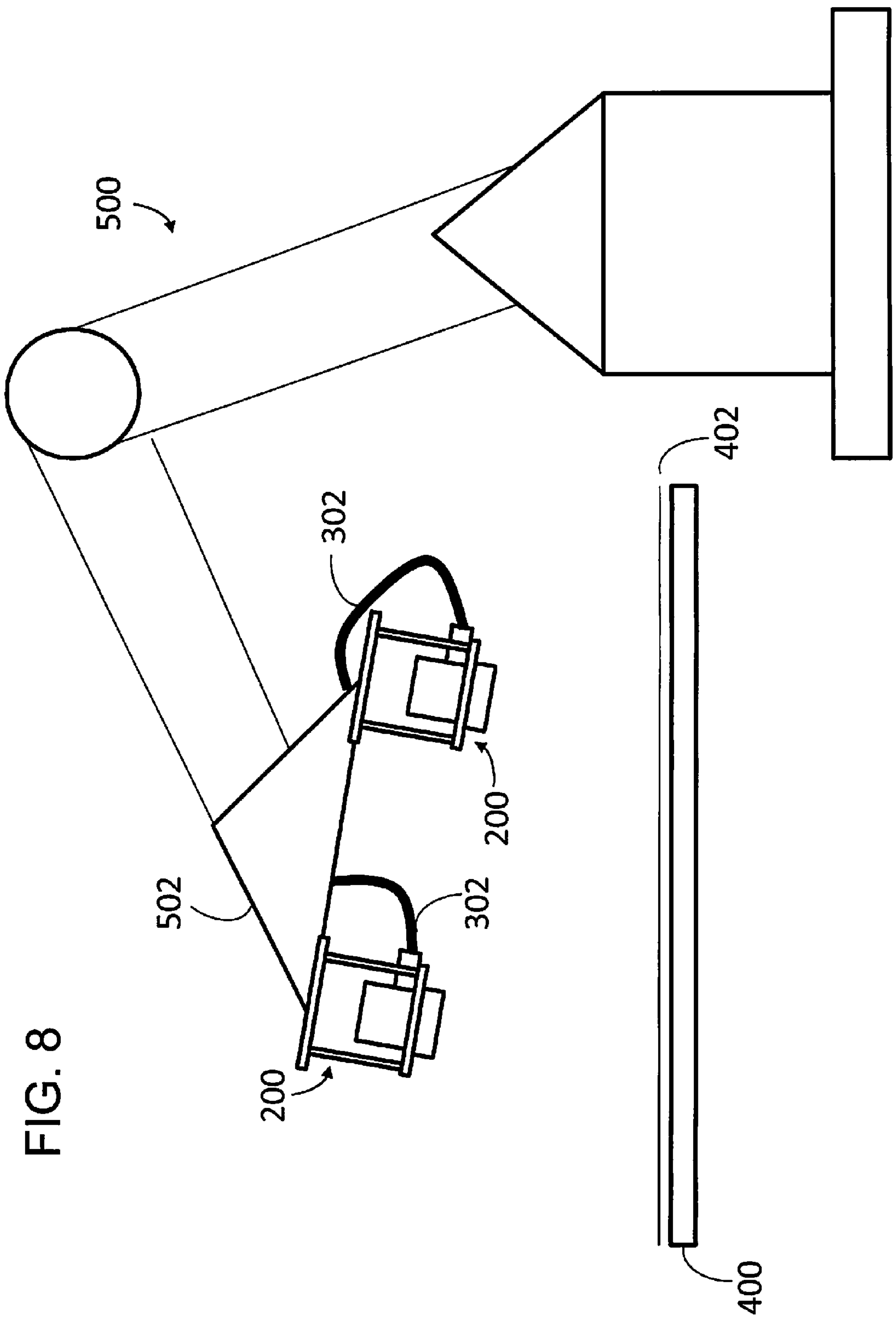
FIG. 8 is a side view diagram of a robot arm with several air amplifier assemblies on an end effector.

FIG. 8 illustrates an embodiment containing plural assemblies 200, such as 2 to 10, for example 4-6 assemblies connected to the same support (e.g., rail 304/member 306 or robot arm). Each assembly may be connected to a separate duct 302. The high pressure air flow of each of these ducts may be controlled separately. Alternatively, the ducts could be interconnected so that the assemblies 200 may be controlled together. The rail 304/connecting member 306 or the robot arm 500 may move the assemblies 200 in tandem over the stack 404.

The pressure and volume flow rates of the different airflows can vary in embodiments. Preferred embodiments may rely on compressed air entering the first intake at around 75-125, such as 90-100 pounds per square inch gauge (psig) and 10-20, such as 14-16 standard cubic feet per minute (SCFM). Around 75-125, such as 188-194 SCFM of ambient air may be drawn into the second intake and around 75-125, such as 200-204 SCFM may be exhausted through the outlet.

While the substrate supporting the sheet of paper 402 was described as a glass plate 400, it should be noted that any other substrate material may be used, such as plastic, metal, ceramic, etc. having a plate or other shape. The glass or plastic plate 400 preferably comprises a cover plate for a photovoltaic module. Thus, the plate 400 encloses a plurality of photovoltaic cells to form the module. The plates 400 in the stack 404 may comprise bare plates which will be used to enclose a photovoltaic module after the plates are lifted from the stack 404. Alternatively, the plates 400 in the stack 404 may already be part of a photovoltaic module. In this case, the stack 404 may comprise a stack of modules, where adjacent modules are separated by paper sheets 402.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. A method for removing a sheet of paper from a substrate, comprising:

providing an air exhaust stream from an outlet of an air amplifier to the sheet of paper on the substrate to perturb the sheet of paper;

lifting the perturbed sheet of paper from the substrate using a sub-atmospheric intake of the air amplifier; and moving the air amplifier in relation to the sheet of paper on the substrate such that the air exhaust stream perturbs a first portion of the sheet of paper before the sub-atmospheric intake of the air amplifier passes over the first portion of the sheet of paper to lift the first portion of the sheet of paper from the substrate.

2. The method of claim 1, wherein the sub-atmospheric intake generates a pressure below one atmosphere to lift the perturbed sheet of paper from the substrate.

3. The method of claim 2, wherein the substrate comprises a glass plate.

4. The method of claim 3, wherein the glass plate comprises a cover plate of a photovoltaic device.

5. The method of claim 4, wherein the air amplifier moves in relation to the sheet of paper located on a stack of glass plates in which adjacent glass plates are separated by a respective sheet of paper.

6. The method of claim 1, further comprising providing a high pressure air stream having a pressure above one atmosphere into a second inlet of the air amplifier, and directing the air exhaust stream in a direction that is 0 to 45 degrees from the horizontal direction to the sheet of paper.

7. The method of claim 1, wherein the air amplifier is an impulse principle air amplifier or a Coanda effect air amplifier.

8. The method of claim 1, wherein the air amplifier is suspended from at least one rail or a robot arm such that the air amplifier moves in the horizontal direction.

9. The method of claim 8, further comprising a plurality of air amplifiers which move in tandem in the horizontal direction.

10. The method of claim 1, wherein the air amplifier is suspended from at least one rail or a robot arm such that the air amplifier moves in the vertical direction.

11. The method of claim 10, further comprising a plurality of air amplifiers which move in tandem in the vertical direction.

* * * * *